United States Patent
Han

(10) Patent No.: US 7,621,666 B2
(45) Date of Patent: Nov. 24, 2009

(54) BACKLIGHT ASSEMBLY

(75) Inventor: Young Bae Han, Gumi-si (KR)

(73) Assignee: LG. Display Co., Ltd., Seoul (KR)

( * ) Notice: Subject to any disclaimer, the term of this patent is extended or adjusted under 35 U.S.C. 154(b) by 0 days.

(21) Appl. No.: 11/635,436

(22) Filed: Dec. 7, 2006

(65) Prior Publication Data

US 2007/0139962 A1      Jun. 21, 2007

(30) Foreign Application Priority Data

Dec. 20, 2005   (KR) .................... 10-2005-0125901

(51) Int. Cl.
*F21V 7/04* (2006.01)
(52) U.S. Cl. .................. 362/633; 362/294; 362/613; 362/614; 349/65
(58) Field of Classification Search ............... 362/27, 362/29, 31, 225, 613, 614, 633, 634, 28, 362/294, 373; 349/58, 65
See application file for complete search history.

(56) References Cited

U.S. PATENT DOCUMENTS

| | | | |
|---|---|---|---|
| 6,871,979 B2 * | 3/2005 | Mai | 362/241 |
| 7,044,629 B2 * | 5/2006 | Moon | 362/634 |
| 7,388,194 B2 * | 6/2008 | Schneider et al. | 250/288 |
| 2006/0103776 A1 * | 5/2006 | Park | 349/58 |

FOREIGN PATENT DOCUMENTS

| | | |
|---|---|---|
| CN | 1492270 | 4/2004 |
| CN | 1520529 | 8/2004 |
| JP | 2004-220980 | 5/2004 |
| KR | 1020040096048 A | 11/2004 |
| KR | 1020060063415 A | 6/2006 |

OTHER PUBLICATIONS

First Office Action for corresponding Chinese Patent Application Serial No. 2006101467755, dated Nov. 23, 2007.

* cited by examiner

*Primary Examiner*—John A Ward
(74) *Attorney, Agent, or Firm*—Brinks Hofer Gilson & Lione

(57) ABSTRACT

A backlight assembly is provided. The backlight assembly includes a plurality of lamps and a plurality of holes in a cover bottom that correspond to the plurality of lamps. The backlight may be capable of improving luminous efficiency of a plurality of lamps is provided.

22 Claims, 5 Drawing Sheets

BACKLIGHT ASSEMBLY

This Non-provisional Application claims priority under 35 U.S.C. §119(a) on Patent Application No. 125901/2005, filed on Dec. 20, 2005, the entire contents of which are hereby incorporated by reference.

BACKGROUND

1. Field

The present embodiments relate to a backlight.

2. Related Art

A cathode ray tube (CRT) is widely used for a television (TV), a monitor of a measuring instrument, an information terminal, or the like. However, there is currently a demand for the smaller and lighter electronic devices. Because of the large size and weight of the CRT its application in electronic devices is limited.

As a substitute for the CRT, smaller, lighter and thinner display devices have received much attention. For example, a liquid crystal display (LCD) device, a plasma display panel (PDP), and an electro luminescence display (ELD) have all been used as a substitute for the CRT.

The LCD device has advantages of low power consumption and full color reproduction as well being small and light weight. Accordingly, the LCD device is being widely used for monitors of a mobile device, a desktop computer, and a large screen TV.

The LCD device may display a desired image by individually supplying image information to pixels arranged in a matrix and controlling light transmittance of the pixels.

The LCD device is a non-illuminant display device that cannot emit light by itself. Thus, light must be provided from an outside source, so that the LCD device can display an image. The LCD device may include a backlight assembly as an outside source.

The backlight assembly is categorized into edge type and a direct type assemblies, according to an installation position (location) of a light source.

The direct type backlight assembly includes a plurality of lamps arranged on the same plane at predetermined intervals. In the direct type backlight assembly, light from each of the lamps is emitted directly to the front of the assembly.

The edge type backlight assembly includes a lamp disposed on a side of a light guide panel. Light from the lamp is made incident to the light guide panel from the side. The light guide panel converts light into surface light and illuminates the light to the front of the assembly.

The direct type backlight assembly may achieve uniform brightness and thus is widely used in the field of an LCD device having a large-screen panel.

FIG. 1 is a view illustrating a general direct type backlight assembly.

As illustrated in FIG. 1, the general direction type backlight assembly includes a plurality of lamps 5 arranged on the same plane of a cover bottom 1. The cover bottom 1 is formed of a metallic material. An optical sheet 9 is disposed over the plurality of lamps 5 at a predetermined interval from the lamps 5. The optical sheet 9 includes a diffuser sheet 9a and a prism sheet 9b. The optical sheet 9 is disposed on a bank 1a. A reflector sheet 3 reflecting light is attached on an upper surface of the cover bottom 1. The optical sheet 9 is fixed and supported by a panel guide 7. The panel guide 7 is coupled to the cover bottom 1. The optical sheet 9 is fixed and supported between the bank 1a of the cover bottom 1 and the panel guide 7.

The lamp 5 emits light by an AC voltage supplied from an inverter (not shown). For example, electrons are emitted from a cathode of the lamp 5, and the emitted electrons collide with mercury and inert gases within a glass tube of the lamp, thus exponentially increasing the amount of electrons. A current flows within the glass tube by the flow of those electrons, and the inert gases are excited by the electrons to emit UV rays. The UV rays collide with an illuminant fluorescent substance coated on an inner surface of the glass tube, thereby emitting light.

The light from the lamp 5 is diffused and condensed by the optical sheet 9 and is directed to the front.

As illustrated in FIG. 2, the backlight assembly is problematic in that a leakage current occurs when an AC voltage is applied to the lamp. For example, since the cover bottom 1 is formed of metal, the metal and the lamp 5 act as electrodes, and a material (e.g., air) filling the space between the cover bottom 1 and the lamp acts as a dielectric substance. Thus, the parasitic capacitance (i.e. C1, C2) is formed between the cover bottom 1 and the lamp 5. The parasitic capacitance (C) may be expressed by Equation 1 below.

$$C = \frac{\varepsilon A}{d} \qquad \text{Equation 1}$$

where C denotes the parasitic capacitance formed between the lamp 5 and the cover bottom 1, $\in$ denotes a dielectric constant of a material filling the space between the lamp 5 and the cover bottom 1, A denotes a lamp-to-cover bottom facing area (hereinafter, referred to as a facing area), and d denotes a distance between the lamp 5 and the cover bottom 1.

As understood from Equation 1, the parasitic capacitance decreases as the distance (d) becomes longer and the facing area (A) becomes smaller. Since the distance (d) and the facing area (A) are fixed and set when the backlight assembly is laid out, the parasitic capacitance (C) between the cover bottom 1 and the lamp 5 is also fixed.

The parasitic capacitance between the lamp 5 and the cover bottom 1 includes the first parasitic capacitance (C1) between each of the lamps 5 and a lower portion of the cover bottom 1, and the second parasitic capacitance (C2) between the outermost lamp 5 and a side portion of the cover bottom 1.

Thus, in the general direct type backlight assembly, the leakage current flows through the cover bottom 1 by the parasitic capacitance between each of the lamps 5 and the cover bottom 1.

Accordingly, the leakage current causes the brightness of the lamp to decrease, thus lowering the luminous efficiency of the lamp and degrading the quality of an image.

SUMMARY

The present embodiments may obviate one or more problems due to limitations and disadvantages of the related art. For example, in one embodiment, a backlight assembly is capable of improving the luminous efficiency of a lamp by minimizing a leakage current.

In one embodiment, a backlight assembly includes a plurality of lamps. A cover bottom includes holes in portions that correspond to the respective lamps.

In one embodiment, a backlight assembly includes a plurality of lamps; a cover bottom that includes holes in portions that correspond to the respective lamps; and an insulator formed in each of the holes.

It is to be understood that both the foregoing general description and the following detailed description of the present embodiments are exemplary and explanatory and are intended to provide further explanation of the invention as claimed.

DETAILED DESCRIPTION

Figure 1:
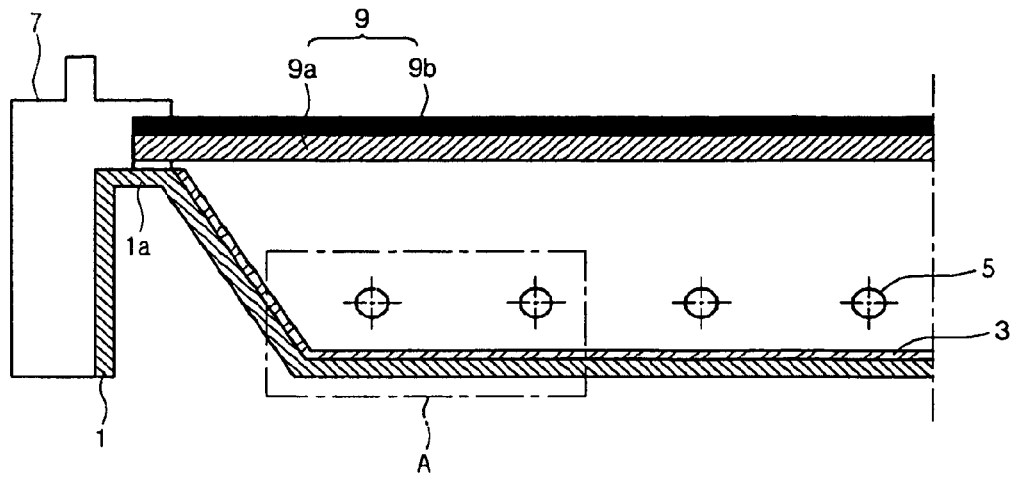
FIG. 1 is a cross-sectional view of a general direct type backlight assembly according to the related art.
Figure 2:
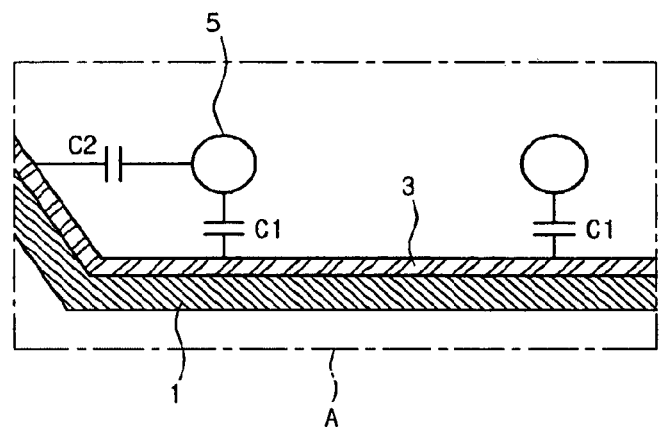
FIG. 2 is an enlarged view of region A of the direct type backlight assembly of FIG. 1.
Figure 3:
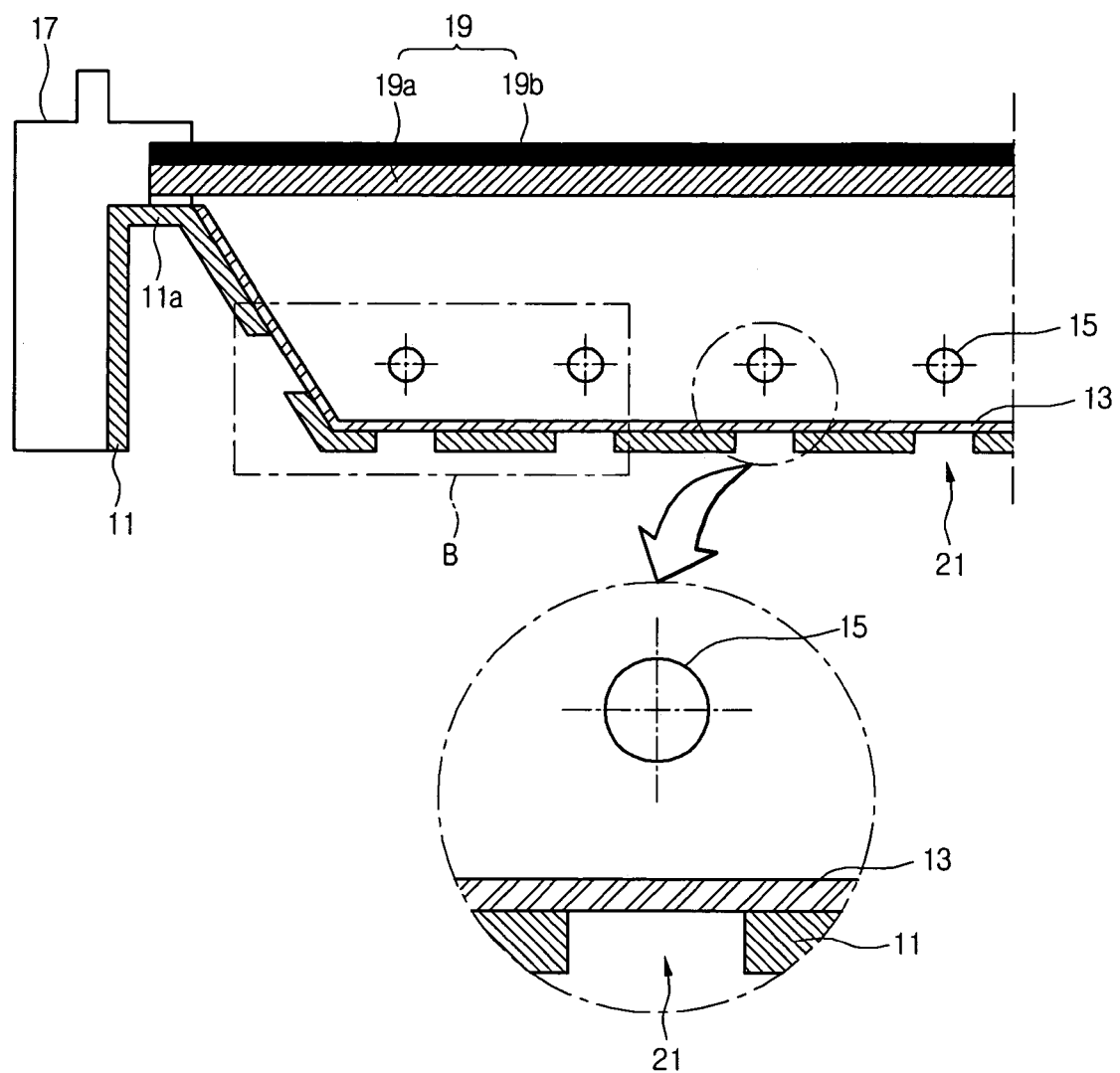
FIG. 3 is a cross-sectional view of one embodiment of a backlight assembly.

In one embodiment, as illustrated in FIG. 3, the backlight assembly includes a plurality of lamps 15 disposed on the same plane over a cover bottom 11. The lamps 15 may be fixed to the cover bottom 11 using a lamp holder (not shown) or the like. Each of the lamps 15 may be a cold cathode fluorescence lamp (CCFL), an external electrode fluorescence lamp (EEFL) or a plurality of light emitting diodes. An optical sheet 19 is disposed over the plurality of lamps 15 at a predetermined interval from the lamps 15.

The optical sheet 19 includes a diffusion sheet 19a and a prism sheet 19b. Bank 11a is formed at both sides of the cover bottom 11 to space the optical sheet 19 apart from the lamps 15. Each bank 11a protrudes from a bottom of the cover bottom 11 to a predetermined height. The optical sheet 19 is mounted on the bank 11a. A reflector sheet 13 that reflects light is attached on an upper surface of the cover bottom 11. The optical sheet 19 is fixed and supported by a panel guide 17. The panel guide 17 is coupled to the cover bottom 11. The optical sheet 19 is fixed and supported between the bank 11a of the cover bottom 11 and the panel guide 17.

In one embodiment, the cover bottom 11 includes holes 21 at its portions corresponding to the respective lamps 15. A parasitic capacitance is formed between the lamps 15 and the cover bottom 11, as described above. Accordingly, when the holes 21 are disposed at predetermined portions of the cover bottom 11 that correspond to the respective lamps 15, the parasitic capacitance is not generated. For example, the parasitic capacitance is formed by two electrodes and a dielectric body therebetween and is increased as the facing area of the electrodes becomes greater and the distance between the electrodes becomes shorter.

In one embodiment, each of the lamps 15 acts as one electrode, while the cover bottom 11 acting as another electrodes is removed at portions corresponding the respective lamps 15. Accordingly, when a virtual electrode is at an infinite distance from the lamp 15, the parasitic capacitance becomes almost zero.

In one embodiment, the parasitic capacitance can be reduced almost to zero or zero by removing predetermined portions of the cover bottom that corresponds to the respective lamps 15, and thus the leakage current caused by the parasitic capacitance may also become almost zero or zero.

Figure 4:
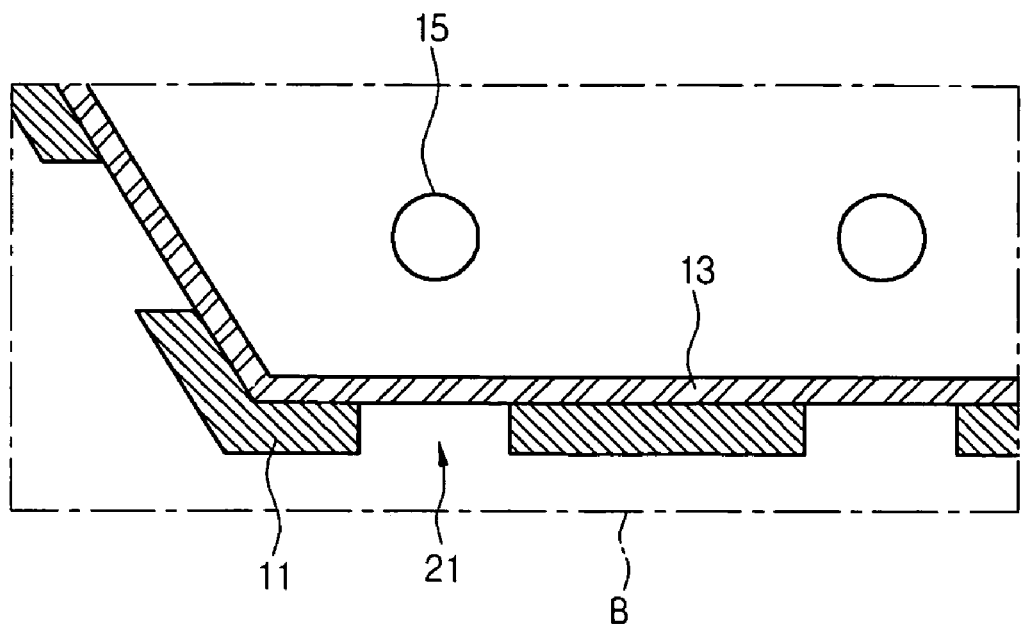
FIG. 4 is an enlarged view of region B of the backlight assembly of FIG. 3.

In one embodiment, as shown in FIG. 4, the holes 21 are formed at any portion of the cover bottom 11 that corresponds to the respective lamps 15. For example, the holes 21 are respectively formed not only in a lower portion of the cover bottom 11 (hereinafter, referred to as a lower cover bottom 11) but also in a side portion of the cover bottom 11 (hereinafter, referred to as a side cover bottom 11) that corresponds to the respective lamps 15. The hole 21 may be formed to correspond to each lamp 15 by a line cutting process. Alternatively, the hole 21 may be formed to correspond to each lamp 15 by an injection molding process.

Figure 5:
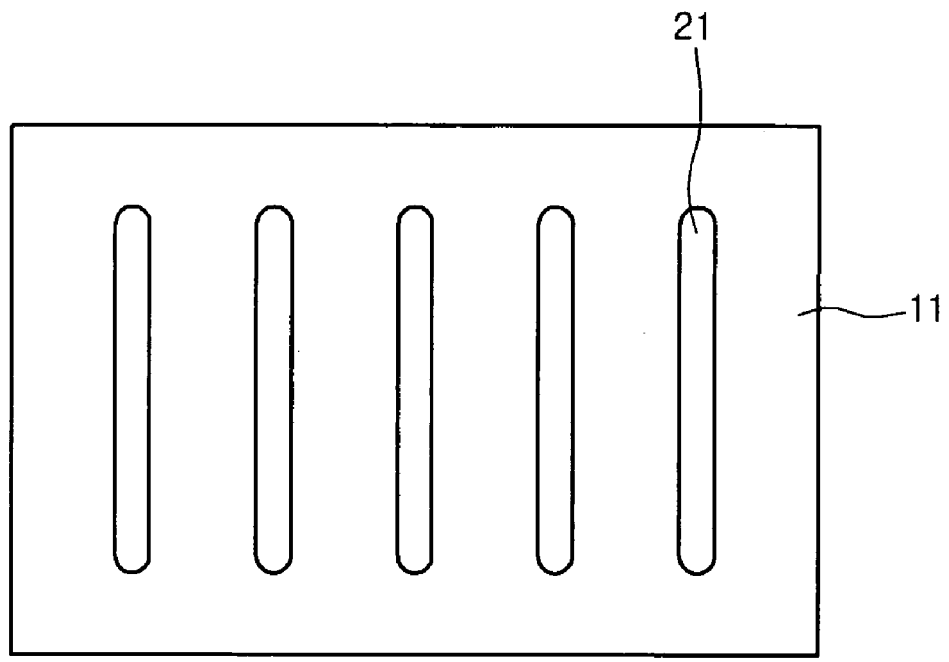
FIGS. 5 and 6 are views illustrating shapes of holes of FIG. 3.
Figure 6:
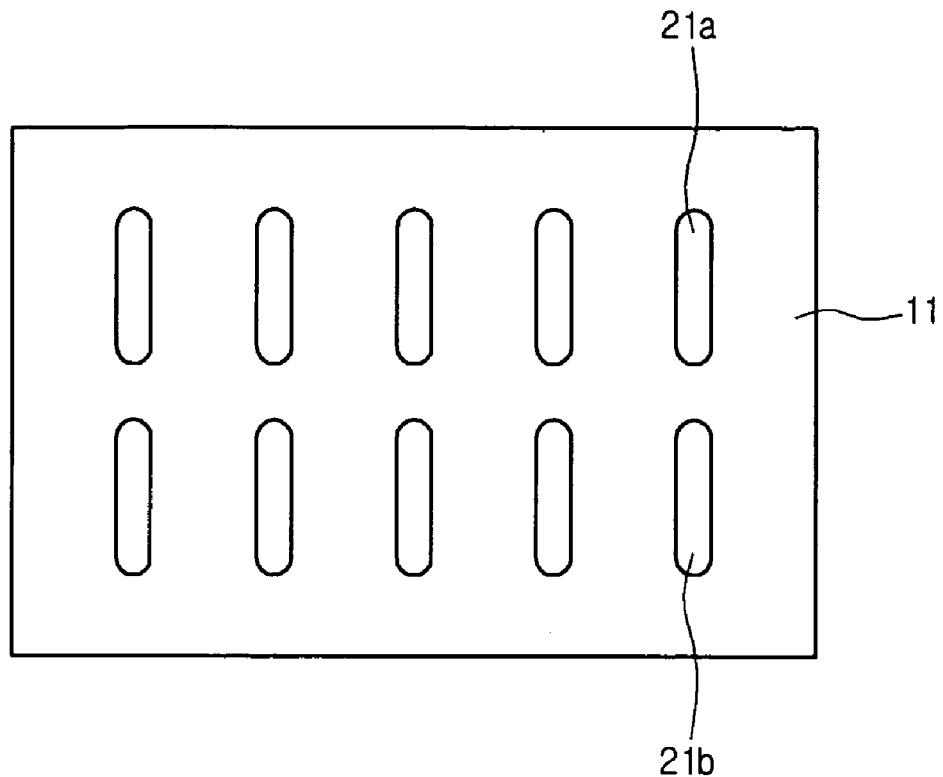

In one embodiment, the shapes of the holes 21 formed at the cover bottom 11 are as illustrated in FIGS. 5 and 6. However, the shape is not limited. For example, as illustrated in FIG. 5, the holes 21 may be formed so as to correspond to the length of the lamps 15. The number of holes 21 may be as many as the lamps 15.

In one embodiment, a backlight assembly that is applied to, for example, a large-screen LCD device, includes a lamp 15 with a very long length. When the length of the lamp 15 is considerably long, the hole 21 corresponding to the length of the lamp 15 may cause the strength of the cover bottom 11 to be lowered, and thus the cover bottom 11 may undergo thermal expansion or generate noises even by small vibrations.

To solve this problem, as illustrated in FIG. 6, two holes 21a and 21b may be formed for each lamp 15 along a longitudinal direction of the lamp 15. In this embodiment, the number of holes 21a and 21b is twice the number of lamps 15. Although two holes 21a and 21b are formed for each lamp 15, more than two holes 21 may be formed for each lamp 15 if necessary.

In one embodiment, a plurality of holes 21 having a circular shape or an oval shape may be formed for each lamp 15 along the longitudinal direction of the lamp 15.

Figure 7:
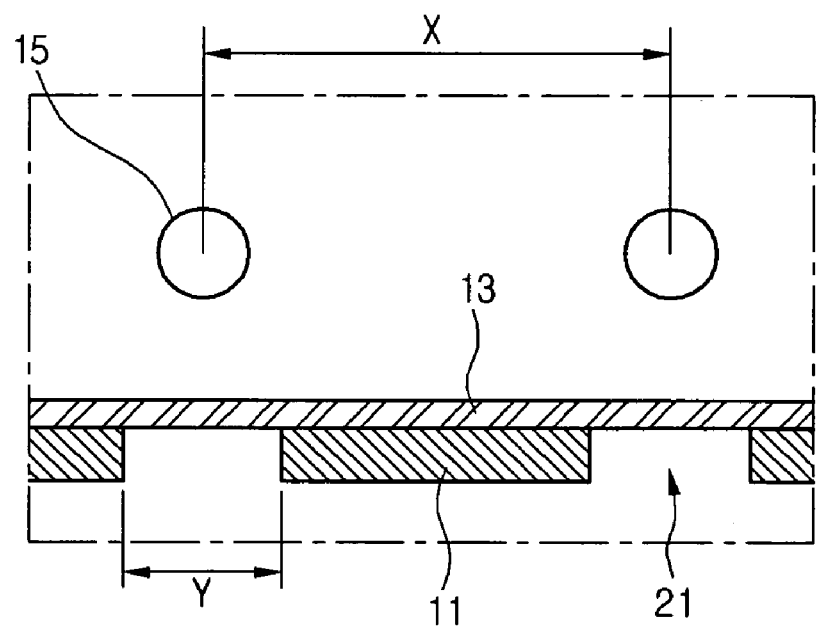
FIG. 7 is a cross-sectional view of one embodiment that prevents the parasitic capacitance of the backlight assembly of FIG. 3.

FIG. 7 illustrates an optimization of the hole 21. X denotes the distance between the lamps 15. Y denotes the width of the hole 21. C denotes the length of the hole 21, and D denotes the length of the lamp 15.

The width (Y) of the hole 21 may be smaller than the distance (X) between the lamps 15 (Y<X). When the width (Y) of the hole 21 is the same as the distance (X) between the lamps 15, the entire lower cover bottom 11 is removed, and thus the cover bottom 11 can no longer perform its functions of fixing and supporting. For this reason, the width (Y) of the hole 21 must be smaller than the distance (X) between the lamps 15.

The length of the hole 21 may be shorter than that of the lamp 15 (C<D). When the lamp 15 is disposed in the cover bottom 11, there is only a small distance between the cover bottom 11 in the longitudinal direction and the lamp 15. If the length of the hole 21 is longer than that of the lamp 15, the cover bottom 11 is almost penetrated in the longitudinal direction of the lamp 15, and thus the remaining portion of the cover bottom 11 at both sides in the longitudinal direction of the lamp 15 can no longer perform fixing and supporting. For this reason, the length of the hole 21 must be smaller than the length of the lamp 15.

In one embodiment, a parasitic capacitance can be prevented since the holes 21 are formed in the portions of the cover bottom 11 corresponding to the respective lamps 15. Parasitic capacitance that is formed between portions of the cover bottom 11 around the holes 21 and the lamps 15 is very small and thus can be ignored.

In one embodiment, when the center of the lamp 15 does not coincide with that of the hole 21, the parasitic capacitance varies around the hole 21 (e.g., between right and left sides of the holes). The varying parasitic capacitance around the holes 21 may cause variations in brightness of the lamps 15.

Accordingly, the hole 21 may be formed to be concentric with respect to the lamp 15. Since the lamp 15 and the hole 21 have the same center, the parasitic capacitance becomes uniform around the hole 21, thereby achieving uniform brightness in each lamp 15.

Figure 8:
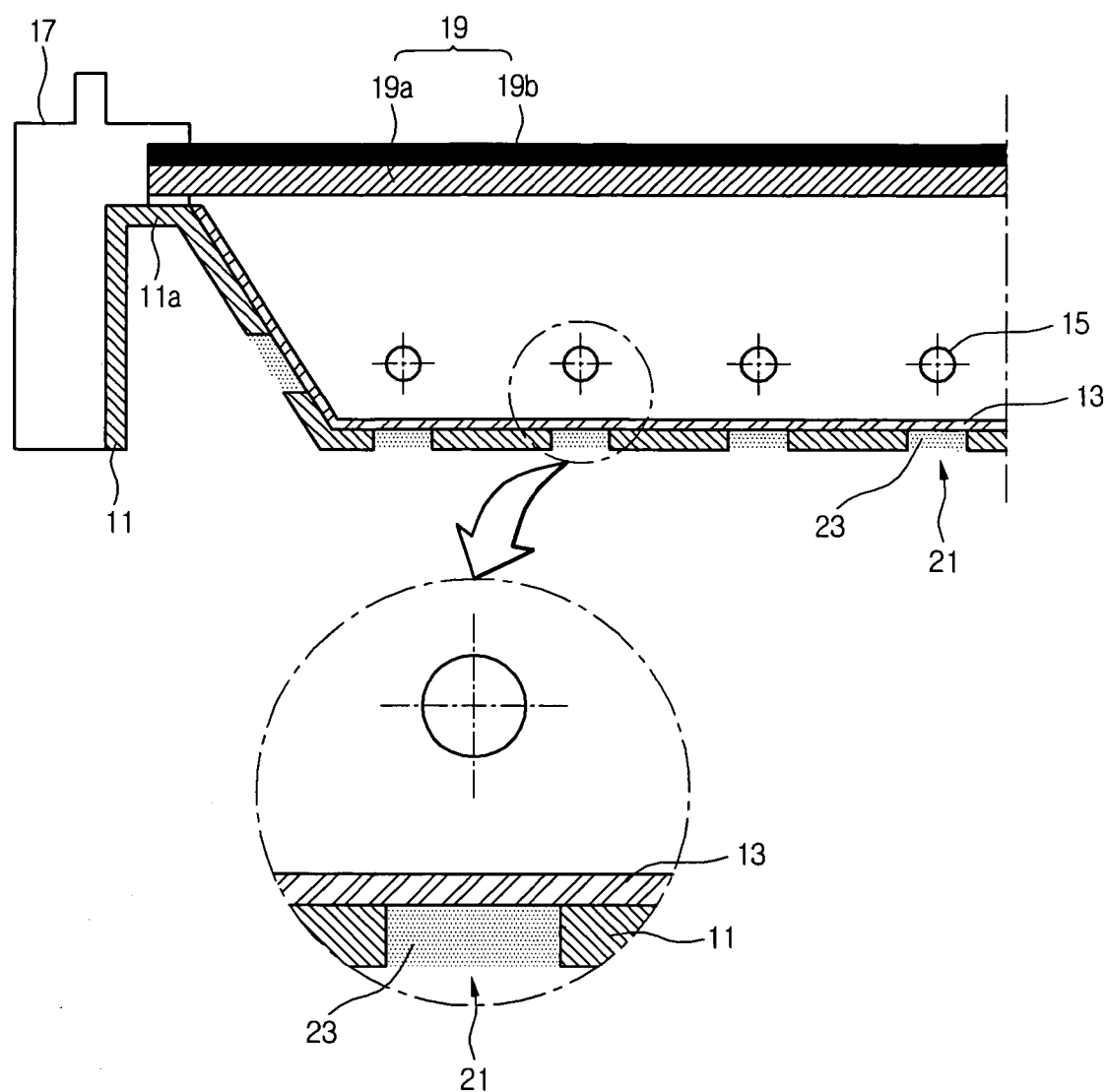
FIG. 8 is a cross-sectional view of one embodiment of a backlight assembly.

In one embodiment, as shown in FIG. 8, an insulator 23 is formed in each hole 21, which is formed on a cover bottom 11.

In one embodiment, as illustrated in FIG. 8, the cover bottom 11 includes a plurality of holes 21 vertically corresponding to the respective lamps 15. Each of the lamps 15 may be a cold cathode fluorescence lamp (CCFL) or an external electrode fluorescence lamp (EEFL). Each hole 21 is formed as a rectangular shape in the longitudinal direction of the corresponding lamp 15. One or two holes 21 may be formed for each lamp 15. For example, a plurality of circular or oval holes may be formed for each lamp 15.

In one embodiment, the holes 21 may be formed at the lower cover bottom 11 and the side cover bottom 11. For example, for a lamp 15 placed at an edge of the cover bottom 11, holes 21 that correspond to the lamp 15 may be formed at both the side cover bottom 11 and the lower cover bottom 11, respectively.

In one embodiment, an insulator 23 having excellent electrical insulating properties is inserted in each hole 21. The insulator 23 is a volume-resistance increasing element having considerable volume resistance. The insulator 23 is formed in the corresponding hole 21 by inserting insulating paste obtained by mixing an insulating material and an adhesive material and hardening the inserted insulating paste. Accordingly, the insulator 23 can be attached to the wall of the cover bottom 11 by the adhesive material within the insulator 23, and is able to cut off flow of a leakage current by the insulating material.

Any material may be used as the insulator 23, provided that the material has a volume resistivity of $10^{10}$ Ω·m or more. For example, the insulator 23 may be melamine, phennolic, acetal, acrylic, epoxy, polystyrene, SAN, acrylonitrile butadiene styrene (ABS), polycarbonate, poly vinyl chloride (PVC), nylon, polyethylene, polysulfone, polyphenylene oxide (PPO), polytetrafluoroethylene (PTFE), fluorinated ethylene propylene (FEP) or the like.

In one embodiment, the insulator is formed in each of the holes and a leakage current caused by the parasitic capacitance is prevented from occurring.

In another embodiment, the insulator formed in each of the holes may serve to increase the strength of the cover bottom and enhance fixing and supporting performance of the cover bottom, as compared to when only the holes are formed.

In one embodiment, the cover bottom includes holes in portions corresponding to the respective lamps, thereby minimizing a leakage current and thus improving luminous efficiency.

In one embodiment, the leakage current is minimized, the luminous efficiency is improved, and the strength of the cover bottom is increased to allow the cover bottom to act as a stronger supporter because the holes are formed at the predetermined portions of the cover bottom corresponding to the respective lamps, and the insulator is formed in each of the holes.

The LCD device is a non-illuminant display device that cannot emit light by itself. Thus, light must be provided from an outside source, so that the LCD device can display an image. The LCD device may include a backlight assembly as an outside source. In one embodiment, a liquid crystal display module includes a backlight unit comprising a plurality of lamps; a cover bottom that includes holes disposed to correspond to the a respective one of the plurality of lamps; a liquid crystal panel disposed over the backlight unit; and a case top disposed over the liquid crystal panel and fixed to the cover bottom.

It will be-apparent to those skilled in the art that various modifications, combinations, and variations can be made in the present invention. Thus, it is intended that the present invention covers the modifications and variations of this invention provided they come within the scope of the appended claims and their equivalents. 17.

What is claimed is:

1. A backlight assembly comprising:
   a plurality of lamps; and
   a cover bottom that includes a plurality of holes disposed at lower portion of the cover bottom and a hole disposed at a side portion of the cover bottom,
   wherein the plurality of holes at the lower portion of the cover bottom each corresponds to a longitudinal length of each lamp, and the hole at the side portion of the cover bottom corresponds to a longitudinal length of each lamp.

2. The backlight assembly according to claim 1, wherein the plurality of lamps are disposed on the same plane.

3. The backlight assembly according to claim 1, further comprising:
   an optical sheet disposed over the lamps;
   a panel guide that is operative to fix and support the optical sheet and is coupled to the cover bottom; and
   a reflector sheet disposed on a upper surface of the cover bottom.

4. The backlight assembly according to claim 1, wherein the holes comprises circular shape.

5. The backlight assembly according to claim 1, wherein the holes comprises an oval shape.

6. The backlight assembly according to claim 1, wherein the holes have a width smaller than a distance between the lamps.

7. The backlight assembly according to claim 1, wherein the holes have a length smaller than a length of the lamps.

8. The backlight assembly according to claim 1, wherein the holes are formed concentric with respect to the corresponding lamps.

9. The backlight assembly according to claim 1, wherein each of the lamps includes one of a cold cathode fluorescence lamp, an external electrode fluorescence lamp and a plurality of light emitting diodes.

10. A backlight assembly comprising:
    a plurality of lamps;
    a cover bottom including a plurality of holes disposed at lower portion of the cover bottom and a hole disposed at a side portion of the cover bottom; and
    an insulator disposed in the plurality of holes at the lower portion of the cover bottom and the hole at the side portion of the cover bottom,
    wherein the plurality of holes at the lower portion of the cover bottom each corresponds to a longitudinal length of each lamp, and the hole at the side portion of the cover bottom corresponds to a longitudinal length of each lamp; and
    wherein the insulator is obtained by inserting an insulating paste into each hole and hardening the insulating paste, the insulating paste being obtained by mixing an insulating material and an adhesive material.

11. The backlight assembly according to claim 10, wherein the plurality of lamps are disposed on the same plane.

12. The backlight assembly according to claim 10, wherein the insulator has a volume resistivity of about $10^{10}$ Ω·m or more.

13. The backlight assembly according to claim 10, wherein the insulator is any of melamine, phennolic, acetal, acrylics, epoxy, polystyrene, SAN, acrylonitrile butadiene styrene, polycarbonate, poly vinyl chloride, nylon, polyethylene, polysulfone, polyphenylene oxide, polytetrafluoroethylene, or fluorinated ethylene propylene.

14. The backlight assembly according to claim 10, further comprising:
    an optical guide disposed over the plurality of lamps;
    a panel guide that is operative to fix and support the optical sheet and is coupled to the cover bottom; and
    a reflector sheet disposed on a upper surface of the cover bottom.

15. The backlight assembly according to claim 10, wherein the holes comprises circular shape.

16. The backlight assembly according to claim 10, wherein the holes comprises an oval shape.

17. The backlight assembly according to claim 10, wherein the holes have a width smaller than a distance between the lamps.

18. The backlight assembly according to claim 10, wherein the holes have a length smaller than a length of the lamps.

19. The backlight assembly according to claim 10, wherein the holes are formed to be concentric with respect to the corresponding the lamps.

20. The backlight assembly according to claim 10, wherein each of the plurality lamps includes one of a cold cathode fluorescence lamp, an external electrode fluorescence lamp and a plurality of light emitting diodes.

21. A liquid crystal display module comprising:
    a backlight unit comprising a plurality of lamps;
    a cover bottom that includes a plurality of holes disposed at lower portion of the cover bottom and a hole disposed at a side portion of the cover bottom;
    a liquid crystal panel disposed over the backlight unit; and
    a case top disposed over the liquid crystal panel and fixed to the cover bottom,
    wherein the plurality of holes at the lower portion of the cover bottom each corresponds to a longitudinal length of each lamp, and the hole at the side portion of the cover bottom corresponds to a longitudinal length of each lamp.

22. The liquid crystal display module according to claim 21, wherein each of the lamps includes one of a cold cathode fluorescence lamp, an external electrode fluorescence lamp and a plurality of light emitting diodes.

* * * * *